United States Patent [19]

Uehara et al.

[11] Patent Number: 4,772,885

[45] Date of Patent: Sep. 20, 1988

[54] LIQUID CRYSTAL COLOR DISPLAY DEVICE

[75] Inventors: Kiyohiro Uehara; Wasaburo Ohta, both of Yokohama; Takamichi Enomoto, Tsukui, all of Japan

[73] Assignee: Ricoh Company, Ltd., Tokyo, Japan

[21] Appl. No.: 799,101

[22] Filed: Nov. 18, 1985

[30] Foreign Application Priority Data

Nov. 22, 1984 [JP] Japan ............................ 59-246347
Dec. 27, 1984 [JP] Japan ............................ 59-273911

[51] Int. Cl.⁴ .................................................. G09G 3/36
[52] U.S. Cl. ................................. 340/784; 340/702; 350/345
[58] Field of Search ............... 340/701, 702, 703, 784; 350/345, 339 F; 313/112

[56] References Cited

U.S. PATENT DOCUMENTS

| | | | |
|---|---|---|---|
| 4,167,307 | 9/1979 | Crikler et al. | 350/345 |
| 4,410,887 | 10/1983 | Stolov et al. | 340/784 |
| 4,470,666 | 9/1984 | Eick | 350/345 |
| 4,578,672 | 3/1986 | Oota et al. | 340/702 |
| 4,580,877 | 4/1986 | Washo | 350/345 |
| 4,600,274 | 7/1986 | Morozumi | 340/703 |
| 4,642,619 | 2/1987 | Togashi | 340/703 |
| 4,678,285 | 7/1987 | Ohata et al. | 350/345 |

FOREIGN PATENT DOCUMENTS

| | | | |
|---|---|---|---|
| 2808268 | 8/1979 | Fed. Rep. of Germany | 350/345 |
| 3531736 | 3/1986 | Fed. Rep. of Germany | 350/345 |
| 0032699 | 3/1978 | Japan | 350/345 |
| 0128513 | 7/1984 | Japan | 350/345 |
| 0149028 | 8/1985 | Japan | 350/345 |

OTHER PUBLICATIONS

W. R. Young—"Combination Reflective/Transmissive Liquid Crystal Display"—IBM Technical Disclosure Bulletin—vol. 15, No. 8—Jan. 1973—pp. 2435-2436.

Primary Examiner—Marshall M. Curtis
Assistant Examiner—Mahmoud Fatahi-yar
Attorney, Agent, or Firm—Oblon, Fisher, Spivak, McClelland & Maier

[57] ABSTRACT

A color display device has a liquid crystal unit for passing therethrough electromagnetic radiation dependent on image information. The color display device also has a light source including electroluminescent materials or fluorescent materials. The electroluminescent materials and the fluorescent materials are essentially the same, but have different light-emitting mechanisms, i.e., electroluminescence and fluorescence. The light source with the electroluminescent materials is used singly or in combination with a color filter and the liquid cystal unit. The light source with the fluorescent materials is combined with a color filter and the liquid crystal unit. When the light source with the fluorescent materials is used, the amounts of the fluorescent materials for emitting lights in red, green, and blue, the light-emitting efficiencies of the fluorescent materials, and the transmissivities of the color filter for the lights in red, green, and blue are determined to meet certain conditions.

7 Claims, 7 Drawing Sheets

LIQUID CRYSTAL COLOR DISPLAY DEVICE

BACKGROUND OF THE INVENTION

The present invention relates to a liquid crystal color display device employing a liquid crystal element or unit as a light switching element.

Heretofore, color display devices have typically employed CRTs (cathode-ray tubes) and have widely been used in television display units, OA (office automation) components, and other display units. The CRT is a type of vacuum tube having a large conical shape. The display unit composed of the CRT must therefore be powered by a high-voltage power supply, requires a complex driver circuit, and is large in overall size, with the result that the display unit could not be thinned down beyond a certain limit.

Recent years have seen the development of panel-shaped liquid crystal display devices, which have resulted in pocketable liquid crystal color television receivers. As described in a Japanese periodical "Nikkei Electronics", 1984, 9-10, pages 211 to 240, such a pocketable liquid crystal color television receiver comprises a liquid crystal panel composed of a glass plate having red, green, and blue color filters assigned to each pixel, another transparent plate with an array of thin-film transistors disposed thereon, a TN (twisted nematic) liquid crystal material sealed between the plates, and a pair of polarizers sandwiching the plates, and an illuminating light source positioned behind the liquid crystal panel. The thin-film transistors are fabricated in association with the red, green, and blue color filters of the respective pixels for switching light.

Although the liquid crystal color display device described above can be constructed in a low profile, it is still disadvantageous in that color generation and reproduceability are insufficient due to the use of a white-light lamp as the illuminating light source and of the optical filters, displayed images have a low contrast and hence cannot be seen well, and the illuminating light source has a large power requirement.

SUMMARY OF THE INVENTION

Accordingly, it is an object of the present invention to provide a liquid crystal color display device which is capable of producing clear color images.

Another object of the present invention is to provide a liquid crystal color display device having a relatively small power requirement for producing clear color images.

A liquid crystal color display device according to the present invention has a liquid crystal unit and a light source. The liquid crystal unit passes therethrough electromagnetic radiation dependent on image information. The light source includes fluorescent materials or electroluminescent materials. The fluorescent materials emit lights in red, green, and blue and are arranged in a fluorescent layer. The light source with the fluorescent materials is used in combination with a color filter which passes therethrough the fluorescent lights in red, green, and blue which are emitted from the fluorescent materials. The amounts of the fluorescent materials for emitting lights in red, green, and blue, the light-emitting efficiencies of the fluorescent materials, and the transmissivities of the color filter for the lights in red, green, and blue are determined to meet certain conditions. When the light source with the fluorescent materials is used, the electromagnetic radiation transmitted through the liquid crystal unit is visible light or invisible light.

The electroluminescent materials used in the light source emit colored lights such as in red, green, and blue, for example, and are arranged in a mosaic pattern. The light source with the electroluminescent materials is used singly or in combination with a color filter. The lights emitted from the electroluminescent materials or these lights as having passed through the color filter are observed through the liquid crystal unit. When the electroluminescent materials are used, therefore, the electromagnetic radiation transmitted through the liquid crystal unit is visible light. The electroluminescent materials and the fluorescent materials are different in their light-emitting mechanisms, i.e., electroluminescence or fluorescence, but are the same substances.

Dependent on whether the electroluminescent materials or the fluorescent materails are used in the light source, the present invention is embodied in the following three basic arrangements or embodiments:

According to the first and second enbodiments, the electroluminescent materials are employed in the light source. In the first embodiment, the liquid crystal color display device includes a liquid crystal unit for controlling light transmitted therethough dependent on image information, and a light source having a light-emitting layer comprising a mosaic of electroluminescent elements capable of emitting colored lights, the light-emitting layer being aligned with the liquid crystal unit, the arrangement being such that the lights emitted from the electroluminescent elements can be observed through the liquid crystal unit.

In the second embodiment, the liquid crystal color display device also includes a color filter for passing therethrough the lights from the electroluminescent materials.

According to the third embodiment, the fluorescent materials are employed in the light source. The liquid crystal color display device includes a liquid crystal unit having a transparent pixel electrode for passing therethrough an electromagnetic radiation dependent on image information, a fluorescent light source having a fluorescent body comprising a fluorescent layer composed of fluorescent materials capable of emitting fluorescent lights in red, green, and blue, and a color filter composed of pixel filter elements in red, green, and blue for passing therethrough the lights emitted from the fluorescent materials, the fluorescent layer being formed to meet the following formulas:

$$T_R \eta_R M_R : T_B \eta_B M_B = 1 : 0.5 \sim 1.5 \quad (I)$$

$$T_B \eta_B M_B : T_G \eta_G M_G = 1 : 0.5 \sim 1.5 \quad (II)$$

$$T_G \eta_G M_G : T_R \eta_R M_R = 1 : 0.5 \sim 1.5 \quad (III)$$

where $T_R$, $T_G$, and $T_B$ are the transmissivities of the red, green, and blue pixel filter elements, respectively, of said color filter, $\eta_R$, $\eta_G$, and $\eta_B$ are the light-emitting efficiencies of the red, green, and blue fluorescent materials, respectively, and $M_R$, $M_G$, and $M_B$ are the amounts (weight ratio) of the red, green, and blue fluorescent materials, respectively, contained in the fluorescent layer.

The color filters combined with the light source in the second and third embodiments are the same.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Identical parts are denoted by identical reference characters throughout several views.

Figure 1:
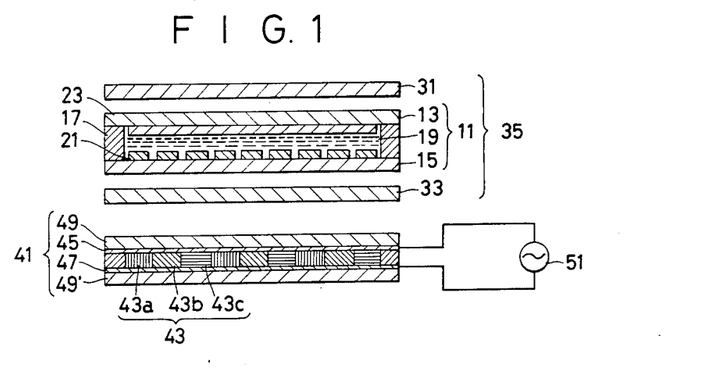
FIG. 1 is an exploded cross-sectional view of a liquid crystal color display device according to a first embodiment of the present invention.

FIG. 1 shows a liquid crystal color display device according to a first embodiment of the present invention, the liquid crystal color display device having a liquid crystal cell generally designated by the reference numeral 11. The liquid crystal cell 11 comprises an upper plate 13, a lower plate 15 disposed parallel to the upper plate 13 in oppositely spaced relation thereto, and a liquid crystal material 19 sealed between the upper and lower plates 13, 15 by a sealing member 17. The lower and upper plates 15, 13 support a transparent pixel electrode 21 and a transparent common electrode 23, respectively. However, the upper and lower plates 13, 15 may support the electrodes 21, 23, respectively. The pixel electrode 21 comprises a matrix of electrode elements. The liquid crystal cell 11 is sandwiched between a first polarizer 31 to be observed by an observer and a second polarizer 33 having an axis of absorption parallel to that of the first polarizer 31. The liquid crystal cell 11 and the first and second polarizers 31, 33 jointly constitute a 90°-TN liquid crystal unit or element 35 serving as a light switching element. The liquid crystal color display device also includes a light source 41 disposed below the liquid crystal unit 35 and having a mosaic-patterned light-emitting pixel layer 43 composed of light-emitting elements 43a, 43b, 43c made of electroluminescent (EL) materials for emitting light in red (R), green (G), and blue (B). The light source 41 also includes a transparent electrode 45 and a back electrode 47, between which the light-emitting pixel layer 43 is interposed. The light-emitting elements 43a, 43b, 43c are aligned with the respective electrode elements of the pixel electrode 21. The transparent electrode 45 and the back electrode 47 are connected to a power supply 51. In response to a DC or AC voltage applied between the electrodes 45, 47, the EL materials of the light-emitting pixel layer 43 are excited to emit light. The light source 41 further includes a transparent plate 49 held against the transparent electrode 45 and a plate 49' held against the back electrode 47.

Figure 2:
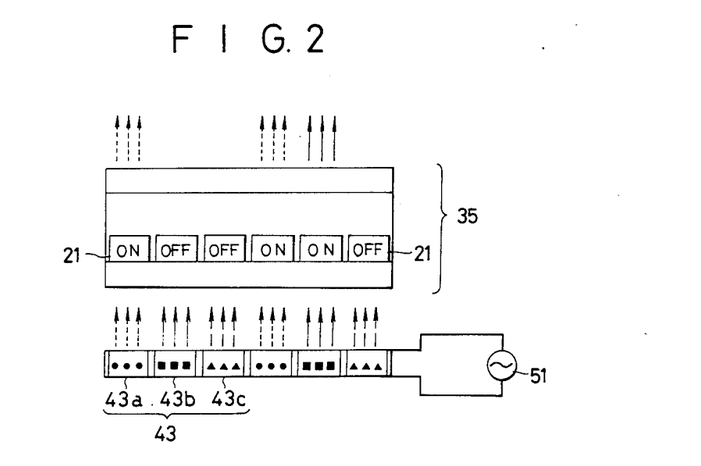
FIG. 2 is a schematic diagram illustrative of operation of the liquid crystal color display device shown in FIG. 1.

When the voltage is applied between the electrodes 47, 45 by the power supply 51, the electroluminescent materials of the light-emitting pixel layer 43 emit lights in the colors R, G, B as indicated by the arrows ←, →, ←, and the lights fall on the liquid crystal unit 35, as shown in FIG. 2. The electroluminescent materials which emit lights R, G, B are indicated by the black circles, squares, and triangles, respectively, in FIG. 2. Since the transparent pixel electrode elements 21 of the liquid crystal unit 35 are aligned with the light-emitting pixel elements 43a, 43b, 43crespectively, the lights passing through the liquid crystal unit 35 can be controlled by applying a voltage based on a color image signal to the transparent pixel electrode elements 21 through thin-film transistors (not shown). The liquid crystal unit 35 allows only those lights to be transmitted therethrough from the light-emitting pixel elements corresponding to the pixel electrode elements 21 to which the voltage is applied. The lights transmitted through the liquid crystal unit 35 can be observed as a fully-colored image. FIG. 2 illustrates the condition in which the lights in R and G are transmitted in the proportion of 2:1. Since the lights emitted from the EL materials are observed, the disposed color image is bright and clear.

Figure 3:
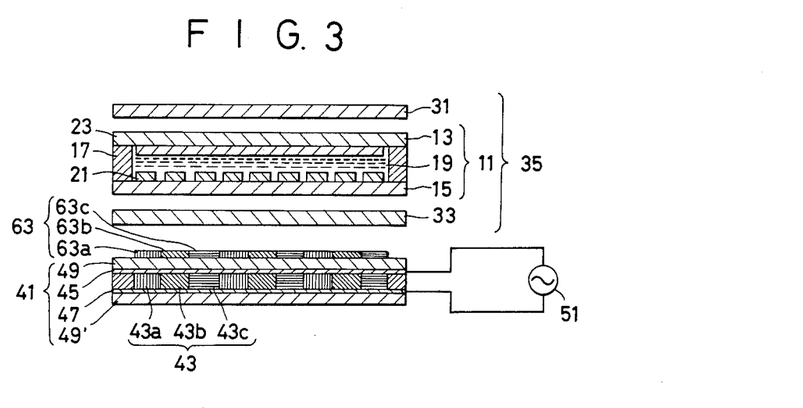
FIG. 3 is an exploded cross-sectional view of a liquid crystal color display device according to a second embodiment of the present invention.

FIG. 3 shows a liquid crystal color display device according to a second embodiment of the present invention. The liquid crystal color display device of FIG. 3 is different from that of FIG. 1 in that a color filter 63 is positioned for passage therethrough of the lights emitted from the EL light-emitting pixel layer 43. The color filter 63 comprises pixel color filter elements 63a, 63b, 63c for selectively passing lights in R, G, B, respectively. The pixel color filter elements 63a, 63b, 63c are aligned respectively with the light-emitting pixel layer elements 43a, 43b, 43c so that the light emitted from the light-emitting pixel layer elements 43a, for example, will fall on the pixel color filter elements 63a. The use of the color filter 63 for passing the lights from the EL light-emitting pixel layer 43 can produce color images of good color balance through the following adjustments;

(1) The hues or dominant wavelengths, the saturations, and the purities of the colors R, G, B of the lights emitted from the light-emitting pixel layer elements can be adjusted by the color filter 63; and (2) The brightnesses of the colors R, G, B of the lights emitted from the light-emitting pixel layer elements can be adjusted by the color filter to levels suitable for human observation.

Figure 4:
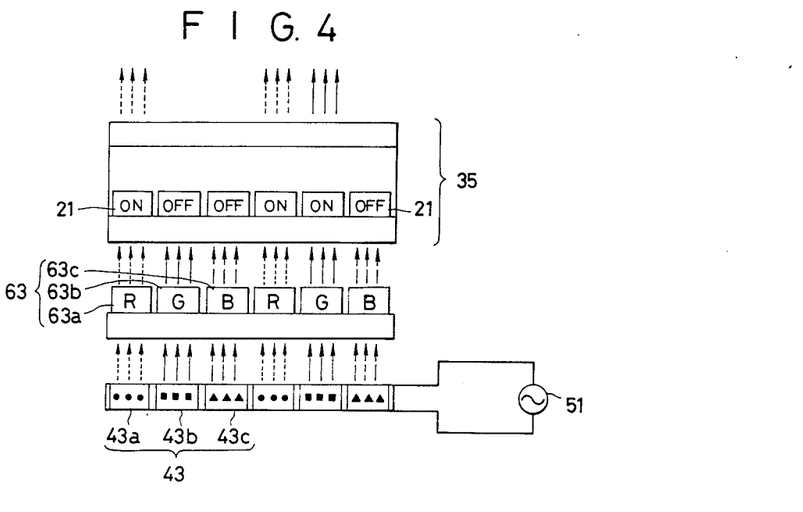
FIG. 4 is a schematic diagram illustrative of operation of the liquid crystal color display device shown in FIG. 3.

FIG. 4, similar to FIG. 2, shows the condition in which the colored lights emitted from the light-emitting pixel layer elements 43a, 43b, 43c pass through the pixel color filter elements 63a, 63b, 63c, and are controlled by the liquid crystal unit 35 for color image display.

The color filter 63 is shown as being positioned on the plate 49 of the light source 41 in FIG. 3. However, the color filter 63 may be positioned anywhere for passing the lights from the EL elements 43a, 43b, 43c. For example, the color filter 63 may be located on either the polarizer 33, or the transparent plate 15, or the transparent pixel electrode 21, or the transparent electrode 23, or another transparent plate (not shown) disposed above the polarizer 31.

The components of the liquid crystal color displace devices according to the first and second embodiments will hereinafter be described in detail.

The transparent plates of the liquid crystal unit and the liquid source comprise transparent supports made of glass or a plastic material such as polyester, polysulfone, polycarbonate, polypropylene, etc. The pixel and common electrodes on the transparent plates are formed as transparent conductive films as of ITO or NESA by the PVD process such as vacuum evaporation or sputtering, or the CVD process. The pixel electrode is patterned by the photoetching process. As described above, the voltage dependent on the color image signal is applied to the pixel electrode by the thin-film transistors to drive the pixel electrode in the active matrix drive mode for displaying the fully-colored image.

The TN liquid crystal material may be any of the materials recited below. The orientation of molecules of the TN liquid crystal material is twisted 90° between by treating the upper and lower plates between which the liquid crystal material is sealed. The TN liquid crystal material may also be a guest-host or dual-frequency driven liquid crystal material.

(1) Liquid crystal compound of p-alkylbenzylidene-p'-cyanoaniline and p-alkoxyoenzylidene-p'-cyanoaniline
(2) Liquid crystal compound of phenyloenzoates X, Y represent an alkyl group, an alkoxy group, etc.
(3) Liquid crystal compound of cyanobiphenyls and cyanoterphenyls X is $C_nH_{2n+1}$    n ranges from 3 to 10
$C_nH_{2n+1}O$    n ranges from 3 to 10

$C_nH_{2n+1}$    n ranges from 3 to 7

(4) Liquid crystal compound of cyclohexanecarboxylphenyle-esters
(5) Liquid crystal compound of phenylcyclohexanes and biphenylcyclohexanes
(6) Liquid crystal compound of phenylpylimidines and phenyldioxanes
(7) Mixture of the above liquid crystal compounds or mixture of the above liquid crystal compounds and cholesteric compounds The transparent electrode 45 of the light source 41 (FIGS. 1 and 3) may be formed in the same manner as the transparent electrode of the liquid crystal cell. The back electrode 47 may either transparent or opaque. Where the back electrode 47 is opaque, it may be a metal electrode comprising a metal plate or another plate and a metal film deposited thereon. The metal film of the metal electrode may be formed of aluminum, copper, silver, or gold. Since metal has a high light reflecting capability, the metal electrode can reflect the lights from the EL materials toward the liquid crystal cell for efficient utilization of the light energy generated. The displayed image can also be improved in color balance by using the varying spectral light reflecting characteristics of different metals. For example, inasmuch as copper and gold have high reflectivities for longer-wavelength lights ranging from yellow light to red light, the metal electrode of copper or gold can increase the brightness of the EL material which emits red light in particular.

The light-emitting pixel layer in the light source 41 for emitting lights in R, G, B can be formed by depositing the EL materials on a plate or substrate. The mosaic-patterned light-emitting pixel layer may be formed in the same process as the process of manufacturing cathode-ray tubes for use in color television recievers. Since the EL light-emitting pixel layer is not used in a vacuum and is of a flat configuration, it may be formed by a printing process similar to the three-color gravure or silk screen printing process. As an alternative, the light-emitting pixel layer elements may be formed by the lithographic process using a photoresist.

The EL materials are used principally in the form of powder. Examples of the EL material for emitting red light include $Y_2O_2S$:Eu (yttrium oxysulfide:europium), $Y_2O_2$:Eu (yttrium oxide:europium), (Zn Cd) S:Ag (zinc sulfide, cadmium:doped with silver), and GaP:In (gallium phosphide:doped with indium). Examples of the EL material for emitting green light include $ZnSiO_3$(Mn) (manganese-doped zinc silicate), ZnS:CuAl (zinc sulfide:doped with copper and aluminum), (Zn Cd) S:Cu (zinc sulfide, cadmium:doped with copper), (Zn Cd) S:Ag (zinc sulfide, cadmium:doped with silver) (the amount of CdS is smaller than that of the EL material for emitting red light), and ZnO:Zn (zinc oxide:doped with zinc). Examples of the EL material for emitting blue include ZnS:Ag (zinc sulfide:doped with silver), (ZnS, ZnO):Ag (zinc sulfide, zinc oxide:doped with silver), and $SnO_2$ Eu (tin oxide:doped with europium).

The power supply 51 comprises a DC or AC voltage generator. Where the power supply 51 is an AC voltage generator, it should produce a voltage having a frequency ranging from the commercial frequency (50 or 60 Hz) up to about 100 KHz, preferably in a frequency range of from 1 to 10 KHz. The voltage may range from a few volts to a few kilovolts. To simplify the power supply 51, the commercially available frequency and voltage should preferably be employed.

The color filter 63 (FIGS. 3 and 4) can be deposited by the photolithograpic process, the electrodeposition process, the vacuum evaporation process, the printing process, or the like. Although the color filter may comprise either a dichroic mirror having a multilayer film composed of a material of a high refractive index and a material of a low refractive index or a dye filter, the dye filter is more advantageous in terms of cost. The dye used in the dye filter for the red filter elements may be Lanyl red GG (manufactured by Sumitomo Chemical) or Kayanil Floxin NK (manufactured by Nihon Kayaku). The dye used in the dye filter for the blue filter elements may be Suminol milling yellow MR (manufactured by Sumitomo Chemical) or Cibacron turquoise blue TG-E (manufactured by Ciba-Geigy). The dye used in the dye filter for the blue filter elements may be Cyanine 6B (manufactured by Nihon Kayaku).

While in each of the above embodiments the transparent pixel electrode is employed and driven as by TFTs in the active matrix drive mode for full-color image display, other electrode arrangements may be used, and monochromatic or multicolor image display other than the full-color image display may be performed.

For example, stripes of electrodes may be provided in X and Y directions, and the EL light-emitting pixel layer elements and also the pixel filter elements may be disposed in alignment with intersections of the electrode stripes for displaying images in full colors in the multiplex drive mode. With such a modification, the liquid crystal cell, the light-emitting layer, and the color filter may be arranged in the same manner as described above. Since the multiplex drive mode has a limitation on a higher duty cycle due to a crosstalk effect, the active matrix drive mode is more advantageous than the multiplex drive mode.

Instead of using the light-emitting pixel layer elements for emitting R, G, B lights, an EL material for emitting color in a single color may be employed for displaying a colored image. For example, a plurality of 8-shaped segment electrodes are used each associated with a light-emitting layer for emitting light in a desired color and also with a color filter, so that an image can be displayed in a single color, for example, red. Multiple colors may also be displayed by providing a plurality of different-color light-emitting layers respectively for the segment electrodes and using different colors in different figure positions.

Figure 5:
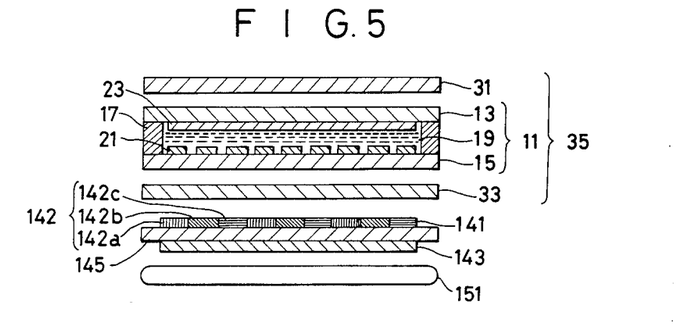
FIG. 5 is an exploded cross-sectional view of a liquid crystal color display device according to a third embodiment of the present invention.

FIG. 5 illustrates a liquid crystal color display device according to a third embodiment of the present invention.

The liquid crystal color display device shown in FIG. 5 includes the liquid crystal unit 35 as illustrated in FIGS. 1 through 4. The liquid crystal color display device also includes a color filter 141 disposed below the liquid crystal unit 35 and having a mosaic color filter body 142 comprising pixel color filter elements 142a, 142b, 142c of red (R), green (G), and blue (B), respectively. The pixel color filter elements 142a, 142b, 142c are aligned with the transparent pixel electrode elements 21, respectively.

A fluorescent layer 143 positioned below the color filter 141 contains fluorescent materials capable of emitting fluorescent lights in R, G, B, respectively. The color filter 141 and the fluorescent layer 143 are supported on the opposite sides of a transparent plate 145 interposed therebetween.

A lamp 151 serving as an energy source for emitting fluorescent light is disposed below the fluorescent layer 143. The lamp 151 and the fluorescent layer 143 jointly serve as a fluorescent light source.

Figure 6:
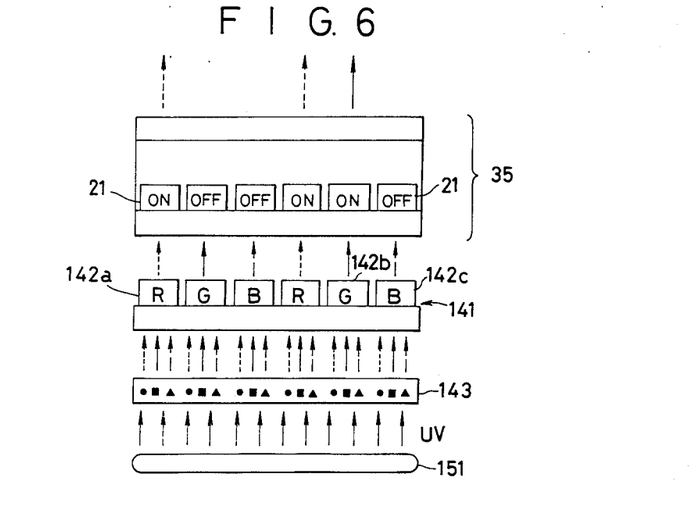
FIG. 6 is a schematic diagram illustrative of operation of the liquid crystal color display device shown in FIG. 5.

As shown in FIG. 6, when the lamp 151 is energized, the fluorescent materials in the fluorescent layer 143 are excited to emit lights in R, G, B in the directions of the arrows--, →,--. The fluorescent materials for emitting lights in R, G, B are indicated by the black circles, squares, and triangles, respectively, in FIG. 6. These lights impinge upon the pixel filter body 142. The red light (←→) passes through the red filter elements 142a, the green light (→) passes through the green filter elements 142b, and the blue light (--) passes through the blue filter elements 142c. The transmitted lights then fall on the liquid crystal unit 35. As the transparent pixel electrode elements 21 are aligned with the pixel filter elements 142a, 142b, 142c, respectively, the lights passing through the liquid crystal unit 35 can be controlled by applying a voltage representing a color image signal to the transparent pixel electrode elements 21 through thin-film transistors (not shown). The liquid crystal unit 35 allows only those lights to be transmitted therethrough from the filter elements corresponding to the pixel electrode elements 21 to which the voltage is applied. FIG. 6 illustrates the condition in which the lights in R and G are transmitted in the proportion of 2:1.

Figure 7:
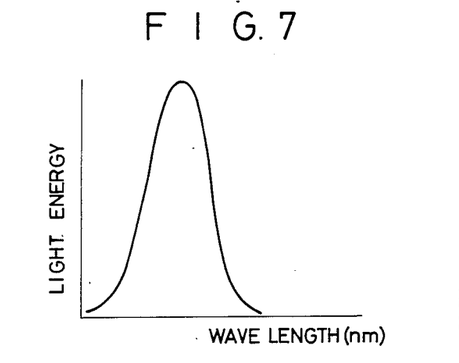
FIGS. 7 through 9 are graphs showing the color display characteristics of the liquid crystal color display device of FIG. 5.
Figure 8:
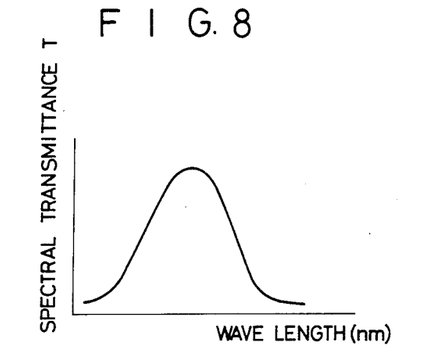
Figure 9:
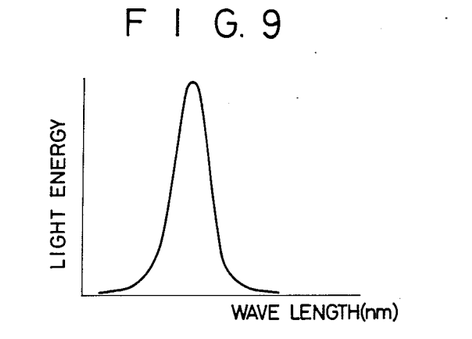

The lights falling on the color filter 141 are the mixture of fluorescent lights in R, G, B that are emitted from the fluorescent layer 143, the fluorescent lights being brighter than light emitted from an orginary white-light source. White light has an energy distribution over the full wavelength range beyond a visible light range. However, almost all light energy of the fluorescent lights emitted from the fluorescent layer 143 is utilized for color separation, and hence the energy efficiency is high to thereby produce bright images that are displayed. The light obtained by passing the fluorescent lights in R, G, B through the filter elements is characterized by the product of the fluorescent wavelength characteristics and the filter elements wavelength characteristics, and has a sharp rising edge with a small half width. Therefore, the light is closer to monochromatic light which allows sharp images to be produced. For example, when fluorescent light in B emitted from the blue fluorescent material having the characteristics of FIG. 7 falls on the blue pixel color filter element 142b having the characteristics of FIG. 8, then the transmitted light from the color filter element 142b has characteristics as shown in FIG. 9 which is clearcut and closer to that of monochromatic light. As the fluorescent light from the fluorescent material is of large light energy, it can produce a bright image even after having passed through the color filter. The fluorescent layer can provide a uniform light-emitting surface unlike a conventional color panel in which a linear illuminating light source is employed for illuminating the light switching element from its back through a photoconductive plate or a diffusion plate. Therefore, clear color images can be displayed by employing the fluorescent layer and the color filter. With some combinations of fluorescent materials and color filter, however, color generation may be rendered irregular and color intensities may be uneven, resulting in lowered color reproduceability.

Figure 10:
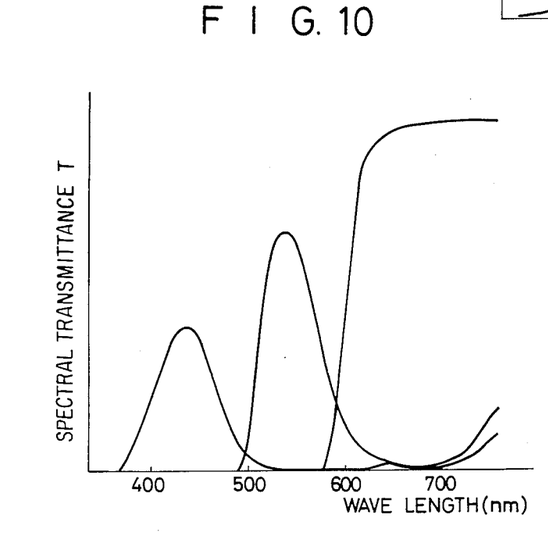
FIG. 10 is a graph showing the spectral characteristics of pixel filters R, G, B.

FIG. 10 is a graph showing spectral transmissivities of the R, G, B filter elements. The graph indicates that the amounts of lights passing through the R, G, B filter elements are not the same. According to the present invention, however, the amounts of lights passing through the R, G, B filter elements are equalized by controlling the ratio of the fluorescent materials used. More specifically, the quantities of the fluorescent materials used are determined by the aforesaid formulas (I)

through (III), and more preferably by the following formulas (I') through (III'):

$$T_R \eta_R M_R : T_B \eta_B M_B = 1:0.8 \sim 1.2 \quad (I')$$

$$T_B \eta_B M_B : T_G \eta_G M_G = 1:0.8 \sim 1.2 \quad (II')$$

$$T_G \eta_G M_G : T_R \eta_R M_R = 1:0.8 \sim 1.2 \quad (III')$$

The transmissivities means the transmissivities at the peak value.

Figure 11:
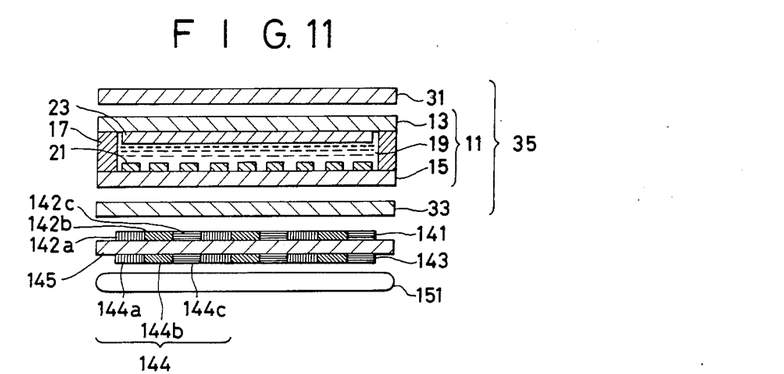
FIG. 11 is an exploded cross-sectional view of a modification of the a liquid crystal color display device according to the third embodiment of the present invention.
Figure 12:
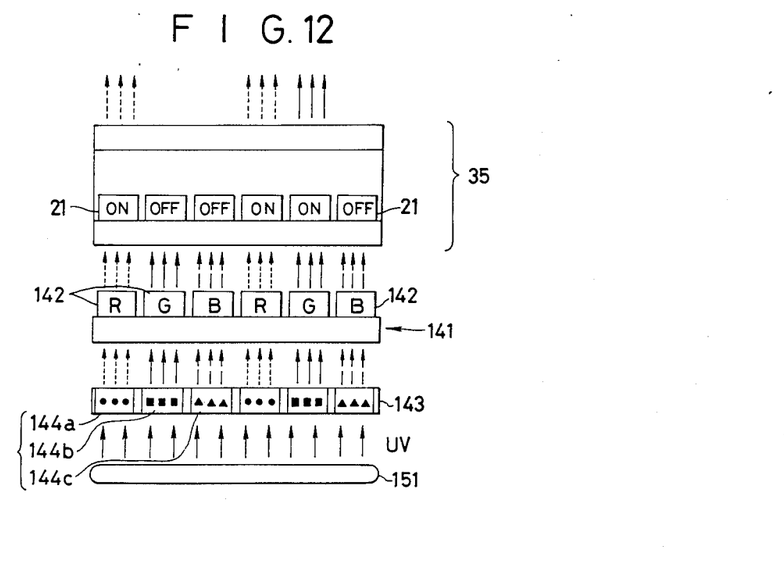
FIG. 12 is a schematic diagram illustrative of operation of the liquid crystal color display device shown in FIG. 11.

FIG. 11 is a modification of the liquid crystal color display device of the third embodiment. The modified liquid crystal color display device includes a fluorescent layer 143 comprising a mosaic-patterned pixel fluorescent body 144 composed of pixel fluorescent elements 144a, 144b, 144c aligned with the color filter elements 142a, 142b, 143c and the pixel electrode elements 21. The fluorescent elements 144a, 144b, 144c contain a fluorescent material of red (R indicated by the black circles), a fluorescent material of green (G indicated by the black squares), and a fluorescent material of blue (G indicated by the blue triangles), as shown in FIG. 12. In this arrangement, the pixel fluorescent body 143 contains more fluorescent materials in R, G, B, and hence the energy quantities of lights in R, G, B having passed through the fluorescent elements for observation are increased for more detailed images displayed. In FIGS. 6 and 12, the amounts of the fluorescent materials for emitting lights in R, G, B are equal to each other for the ease of illustration.

The liquid crystal unit, the color filter, and the fluorescent layer are arranged successively in order from the observer. However, these components may be arranged in this manner by suitable means insofar as:

(1) The liquid crystal unit is utilized as a light switching element for light from the fluorescent light source or light from a light source necessary to excite the fluorescent layer; and (2) The light from the fluorescent light source is caused to pass through the color filter. The color filter or the fluorescent layer may be disposed in the liquid crystal unit, and the fluorescent layer and the color filter may be disposed on the outer or inner surface of the tube wall of the lamp.

Figure 13:
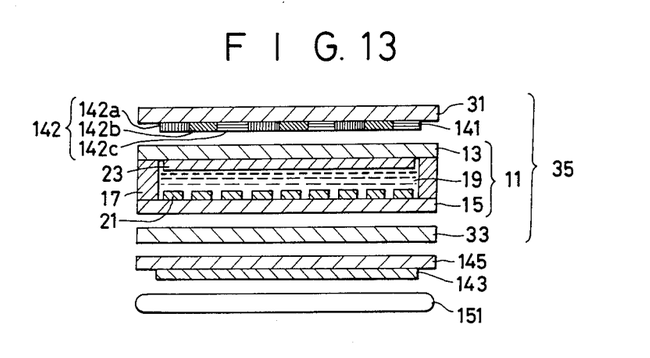
FIGS. 13 through 18 are exploded cross-sectional views of other modifications of the liquid crystal color display device of the third embodiment of the present invention.

FIG. 13 shows another modification in which the color filter 141 is mounted on a surface of the polarizer 31 which is on the side of the liquid crystal cell 11 to be observed by the observer. The other details are the same as those shown in FIG. 5. In order to prevent the R, G, and B lights from being diffused for producing clear images, it is preferable for the fluorescent layer and the color filter to be disposed closely to each other.

Figure 14:
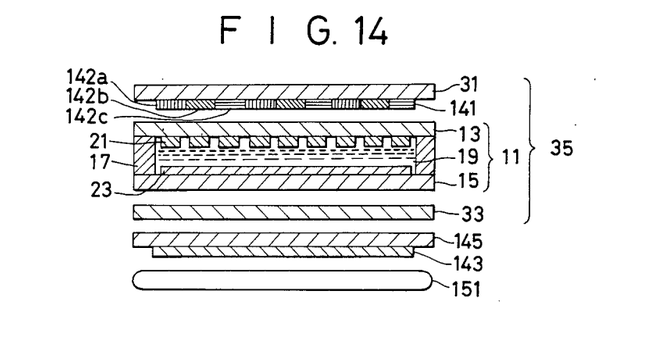

In a still further modification shown in FIG. 14, the pixel electrode 21 and the transparent electrode 23 are positionally switched around in the liquid crystal cell 11 in FIG. 13. The liquid crystal color display device of FIG. 13 can produce clearer images than that of FIG. 13 because the transparent pixel electrode 21 and the color filter 141 are located closely to each other to reduce positional misalignment between the pixel electrode 21 and the filter elements.

Figure 15:
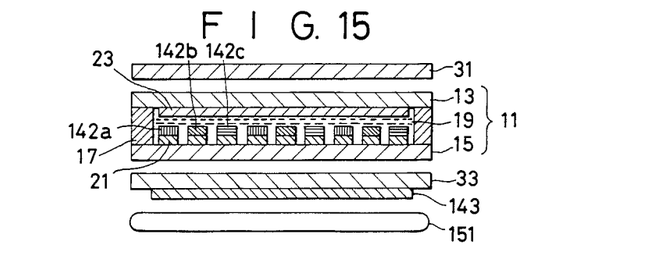

According to another modification of FIG. 15, the pixel filter elements 142a, 142b, 142c of the color filter are disposed respectively on the electrode elements of the transparent pixel electrode 21 in overlapping relation thereto to prevent the pixel filter elements from being misaligned with the pixel electrode elements. The fluorescent layer 143 is disposed on the second polarizer 33 to make the overall construction thinner in profile.

Figure 16:
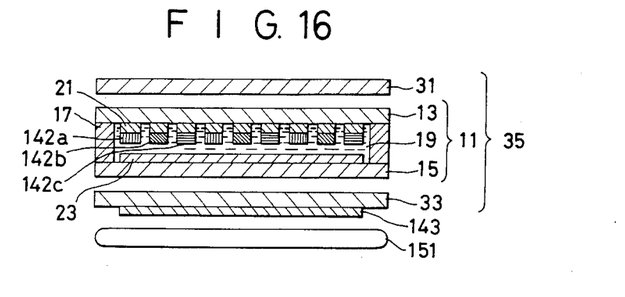

The arrangement of FIG. 16 is of substantially the same as that of FIG. 15 except that the pixel electrode 21 and the pixel filter elements 142a, 142b, 142c are disposed on the upper plate 31.

Figure 17:
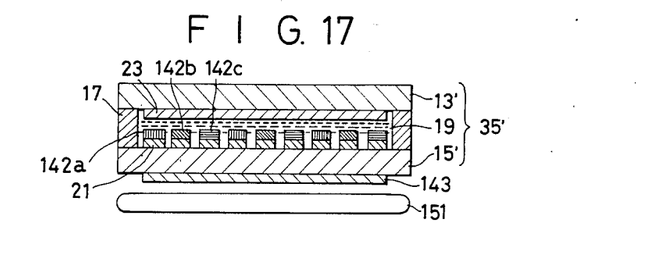

According to a modification of FIG. 17, the upper and lower plates are composed of polarizer plates 13', 15' to achieve a thinner construction. The fluorescent layer 143 is disposed on the lower polarizer plate 15'.

Figure 18:
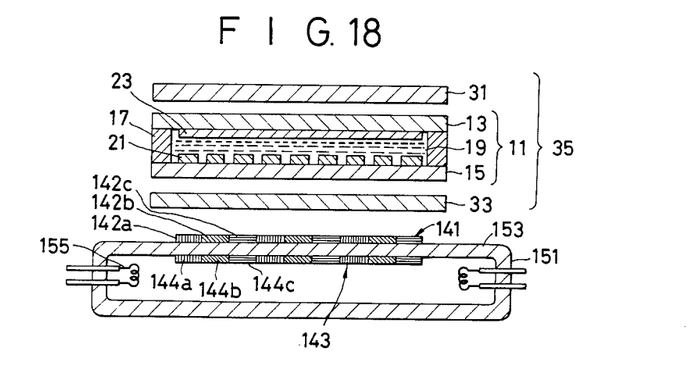

In an embodiment shown in FIG. 18, a fluorescent layer 143 having pixel fluorescent elements 144a, 144b, 144c is disposed on the inner surface of a tube wall 153 of a lamp 151, and a color filter 141 having pixel filler elements 142a, 142b, 142c is disposed on the outer surface of the tube wall 153. The fluorescent layer and the color filter may be deposited successively on the outer surface of the tube wall of the lamp 151. The lamp 151 is capable of radiating ultraviolet light which can excite fluorescent elements of R, G, and B colors. The lamp 151 has filaments 155 therein and a mixture of mercury and argon filled therein. When the filaments 155 are energized, thermions are emitted therefrom to ionize argon and mercury for the emission of ultraviolet light.

In the modifications of FIGS. 13 through 17, the fluorescent layer 143 may be formed of pixel fluorescent elements 144a, 144b, 144c for the advantages described above.

The TN liquid crystal material has been illustrated in each of the above modifications. However, it may be any liquid crystal material capable of functioning as a light swithcing element, such as a guest-host or dual-frequency driven liquid crystal material.

The fluorescent layer in the light source in the third embodiment can be formed by depositing, on a transparent plate, the fluorescent materials for emitting lights in R, G, B upon exposure to ultraviolet light or near-untraviolet light. Where the fluorescent layer is to be formed as a mosaic of fluorescent elements, it may be formed in the same process as the process of manufacturing cathode-ray tubes for use in color television receivers. Since the fluorescent layer layer is not used in a vacuum and is of a flat configuration, it may be formed by a printing process similar to the three-color gravure or silk screen printing process. As an alternative, the light-emitting pixel layer elements may be formed by the lithographic process using a photoresist.

The fluorescent materials are used principally in the form of powder, and may be the same as the various examples for the EL materials given above because the fluorescent and EL materials are only different in their light-emitting mechanism, but are of the same substances.

The lamp 151 may be a lamp for emitting an electromagnetic radiation, primarily ultraviolet and/or near-ultraviolet radiation, for exciting a fluorescent material, such as a mercury-vapor lamp or an ultraviolet fluorescent (UVF) lamp. One or several such lamps are positioned parallel to each other in a plane for illuminating the fluorescent layer. A liquid crystal cell may be interposed between the lamp and the fluorescent layer.

The color filter of the third embodiment may be made in the same manner and of the same materials as the color filter of the second embodiment. That is, the color filters of the second and third embodiments may be the same as each other. The electrodes may be differently arranged, and monochromatic color display, other than the full-color display, may be achieved in the third embodiment.

For example, stripes of electrodes may be provided in X and Y directions, and the pixel filter elements and also the pixel fluorescent elements may be disposed in alignment with intersections of the electrode stripes for displaying images in full colors in the multiplex drive mode. With such a modification, the liquid crystal cell, the fluorescent layer, and the color filter may be arranged in the same manner as described above. Since the multiplex drive mode has a limitation on a higher duty cycle due to a crosstalk effect, the active matrix drive mode is more advantageous than the multiplex drive mode.

With the present invention, a bright and clear color can be displayed by controlling light emitted from EL or fluorescent materials with the liquid crystal unit for observation. The liquid crystal color display device is lower in profile and has a lower power requirement.

Furthermore, light emitted from the fluorescent light source is passed through the color filter and then controlled in its amount transmitted by the liquid crystal unit for displaying a clear color image with good color reproduceability.

Although certain preferred embodiments have been shown and described, it should be understood that many changes and modifications may be made therein without departing from the scope of the appended claims.

What is claimed is:

1. A liquid crystal color display device comprising:
a liquid crystal unit having transparent pixel electrodes for passing therethrough an electromagnetic radiation dependent on image information;
a fluorescent light source including a fluorescent body comprising a fluorescent layer composed of a mosaic arrangement of fluorescent materials capable of emitting fluorescent lights in red, green and blue, said fluorescent layer emitting said fluorescent lights upon irradiation by electromagnetic radiation;
a color filter arranged between said liquid crystal unit and said light source and composed of pixel filter elements in red, green, and blue for passing therethrough the lights emitted from said fluorescent materials;
wherein the mosaic arrangement of fluorescent materials, the pixel filter elements of said color filter and the pixel electrodes of the liquid crystal unit are arranged so that the fluorescent materials for emitting lights in red, green and blue respectively correspond to respective pixel filter elements which in turn correspond to respective pixel electrodes; and said fluorescent layer being formed to meet the following formulas:

$$T_R \eta_R M_R : T_B \eta_B N_B = 1 : 0.5 \sim 1.5 \quad (I)$$

$$T_B \eta_B M_B : T_G \eta_G M_G = 1 : 0.5 \sim 1.5 \quad (II)$$

$$T_G \eta_G M_G : T_R \eta_R N_R = 1 : 0.5 \sim 1.5 \quad (III)$$

where $T_R$, $T_G$, and $T_B$ are the transmissivities of the red, green, and blue pixel filter elements, respectively, of said color filter, $\eta_R$, $\eta_G$, and $\eta_B$ are the light-emitting efficiencies of said red, green, and blue fluorescent materials, respectively, and $M_R$, $M_G$, and $M_B$ are the amounts (weight ratio) of the red, green, and blue fluorescent materials, respectively, contained in said fluorescent layer.

2. A liquid crystal color display device according to claim 1, wherein said liquid crystal unit comprises a TN liquid crystal cell having a transparent pixel electrode and a transparent common electrode spaced therefrom, and a pair of polarizers disposed in sandwiching relation to said TN liquid crystal cell, said fluorescent light source further including a lamp for irradiating said fluorescent layer with the electromagnetic radiation.

3. A liquid crystal color display device according to claim 2, including a plate on which said color filter and said fluorescent layer are mounted.

4. A liquid crystal color display device according to claim 2, wherein said color filter is disposed in said liquid crystal unit.

5. A liquid crystal color display device according to claim 4, wherein said color filter is disposed on one of said polarizers of said liquid crystal unit.

6. A liquid crystal color display device according to claim 5, wherein said liquid crystal cell comprises a liquid crystal material, said polarizers being part of said liquid crystal cell in directly sandwiching relation to said liquid crystal material.

7. A liquid crystal color display device according to claim 4, wherein said color filter is disposed in overlapping relation to said transparent pixel electrode of said liquid crystal cell.

* * * * *